US009514421B2

(12) United States Patent
Mullin et al.

(10) Patent No.: US 9,514,421 B2
(45) Date of Patent: Dec. 6, 2016

(54) SYSTEM AND METHOD FOR DECOMMISSIONING A MOTOR

(71) Applicant: Regal Beloit America, Inc., Beloit, WI (US)

(72) Inventors: Paul Steven Mullin, Yellow Springs, OH (US); Michael David Smith, Rogers, AR (US)

(73) Assignee: Regal Beloit America, Inc., Beloit, WI (US)

( * ) Notice: Subject to any disclaimer, the term of this patent is extended or adjusted under 35 U.S.C. 154(b) by 346 days.

(21) Appl. No.: 14/202,706

(22) Filed: Mar. 10, 2014

(65) Prior Publication Data

US 2015/0253787 A1     Sep. 10, 2015

(51) Int. Cl.
*G05D 17/02* (2006.01)
*G06Q 10/00* (2012.01)
*F24F 11/00* (2006.01)

(52) U.S. Cl.
CPC ....... *G06Q 10/00* (2013.01); *F24F 2011/0091* (2013.01)

(58) Field of Classification Search
CPC .................... G06Q 10/00; F24F 2011/0091
See application file for complete search history.

(56) References Cited

U.S. PATENT DOCUMENTS

| | | | | |
|---|---|---|---|---|
| 4,978,909 A * | 12/1990 | Hendrix | ............... | G01R 31/343 324/76.19 |
| 5,552,682 A * | 9/1996 | Ushikoshi | ................ | H02P 6/16 318/400.04 |
| 5,569,995 A * | 10/1996 | Kusaka | ............... | B60L 11/1807 318/717 |
| 5,754,450 A * | 5/1998 | Solomon | ............... | G01M 15/00 324/765.01 |
| 6,006,170 A * | 12/1999 | Marcantonio | ........ | G01R 31/343 318/806 |
| 6,011,367 A * | 1/2000 | Oedl | ..................... | B60L 15/005 318/135 |
| 6,184,638 B1 * | 2/2001 | Kinpara | ........................ | 318/432 |
| 6,308,140 B1 | 10/2001 | Dowling et al. | | |
| 6,636,823 B1 | 10/2003 | Unsworth et al. | | |
| 6,640,196 B1 * | 10/2003 | Unsworth | ............ | G01R 31/343 702/115 |
| 7,116,077 B2 | 10/2006 | Raftari et al. | | |
| 7,539,549 B1 * | 5/2009 | Discenzo | ............ | F04D 15/0077 324/765.01 |

(Continued)

OTHER PUBLICATIONS

ISR/WO PCT/US15/18943 filed Mar. 5, 2015, date of mailing Jun. 25, 2015, 14 pages.

*Primary Examiner* — Ramesh Patel
(74) *Attorney, Agent, or Firm* — Armstrong Teasdale LLP

(57) ABSTRACT

A motor controller for a motor is described. The motor controller includes a communication device coupled to a memory device. The motor controller is configured to receive, using the communication device, a status query from a client computing device. The motor controller is additionally configured to transmit diagnostic data from the memory device to the client computing device, transmit identification data associated with the motor controller to the client computing device, receive, from the client computing device, a decommission password generated from the identification data, and disable the motor using the decommission password.

20 Claims, 6 Drawing Sheets

(56) References Cited

U.S. PATENT DOCUMENTS

| | | |
|---|---|---|
| 7,545,163 B2 | 6/2009 | Disser |
| 8,253,365 B2 | 8/2012 | Yeh |
| 8,473,229 B2 | 6/2013 | Kucera et al. |
| 8,497,698 B2 | 7/2013 | Yeh |
| 2005/0104616 A1* | 5/2005 | Cullen ............... G01R 31/343 324/750.02 |
| 2008/0074075 A1* | 3/2008 | Davis ............... H02P 23/0077 318/800 |
| 2012/0326645 A1* | 12/2012 | Beifus ............... G05B 23/0264 318/400.21 |
| 2013/0214651 A1 | 8/2013 | Kreidler et al. |
| 2013/0341109 A1* | 12/2013 | Ozaki ............... B60L 3/0061 180/65.51 |

* cited by examiner

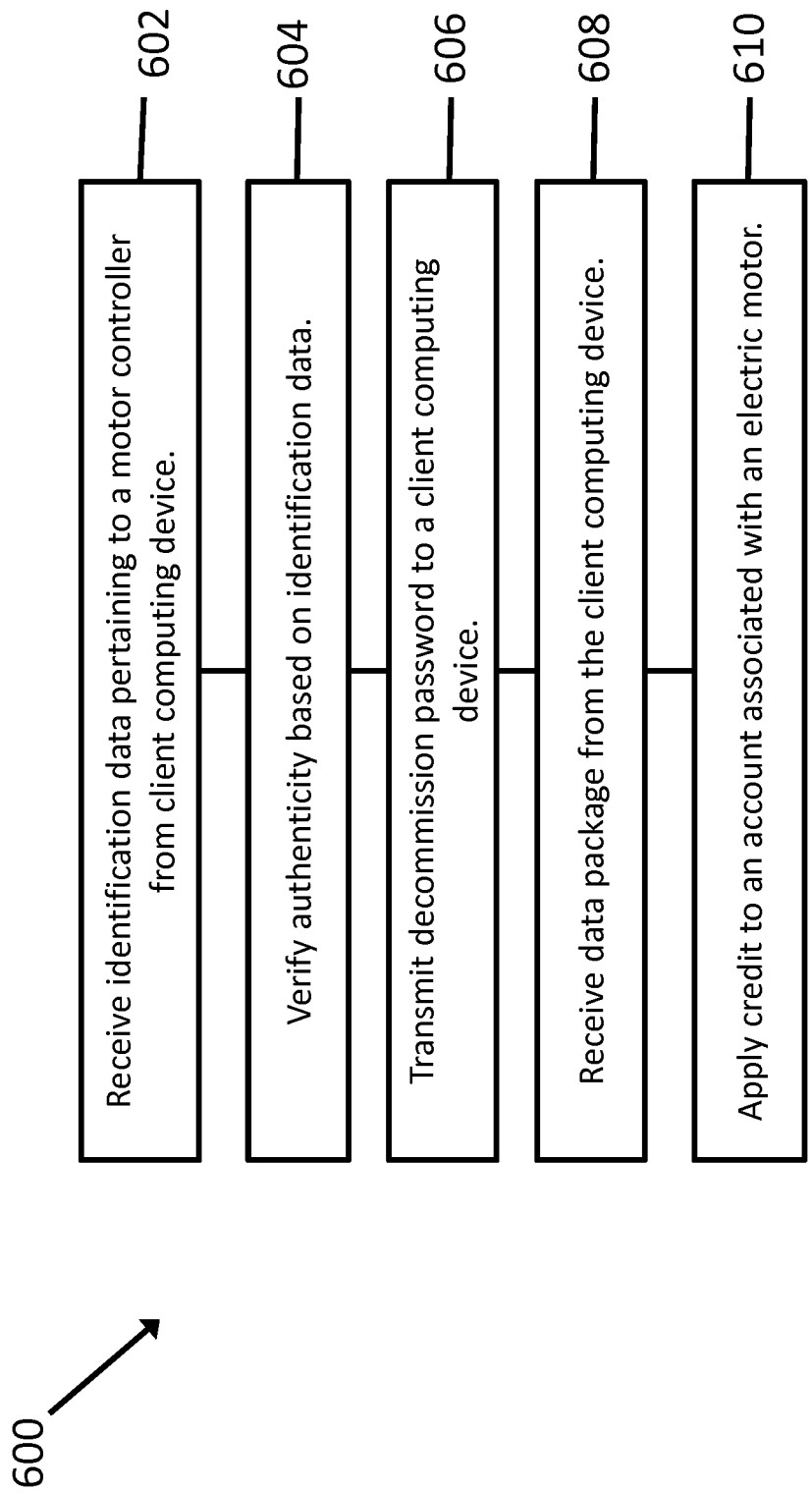

SYSTEM AND METHOD FOR DECOMMISSIONING A MOTOR

BACKGROUND OF THE DISCLOSURE

The field of the invention relates generally to motors, and more specifically, to methods and systems for decommissioning motors.

Known methods for diagnosing a motor involve physically transporting the motor to a service facility, such as a facility operated by the manufacturer. Often, when technicians at the service facility inspect the motor, the technicians find that the motor operates normally and has not experienced any faults, such as unscheduled shut downs. In some instances, costs involved in transporting and inspecting the motor exceed the cost of the motor itself. In addition, time involved in transporting and inspecting the motor to and from the service facility may be wasted when any anomalies in the operation of the motor are due to adjustments that should be made regarding how the motor is installed at a customer location, rather than to the motor itself.

BRIEF DESCRIPTION OF THE DISCLOSURE

In one aspect, a motor controller for a motor is provided. The motor controller includes a communication device coupled to a memory device. The motor controller is configured to receive, using the communication device, a status query from a client computing device. The motor controller is additionally configured to transmit diagnostic data from the memory device to the client computing device, transmit identification data associated with the motor controller to the client computing device, receive, from the client computing device, a decommission password generated from the identification data, and disable the motor using the decommission password.

In another aspect, a method for decommissioning a motor is provided. The method is implemented by a motor controller coupled to the motor. The motor controller includes a communication device coupled to a memory device. The method includes receiving, using the communication device, a status query from a client computing device. The method additionally includes transmitting diagnostic data from the memory device to the client computing device, transmitting identification data associated with the motor controller to the client computing device, receiving, from the client computing device, a decommission password generated from the identification data, and disabling the motor using the decommission password.

In yet another aspect, a computer-readable storage medium having computer-executable instructions embodied thereon is provided. The computer-executable instructions enable a motor controller coupled to a motor to decommission the motor. The motor controller includes a communication device coupled to a memory device. When executed by the motor controller, the computer-executable instructions cause the motor controller to receive, using the communication device, a status query from a client computing device, transmit diagnostic data from the memory device to the client computing device, transmit identification data associated with the motor controller to the client computing device, receive, from the client computing device, a decommission password generated from the identification data, and disable the motor using the decommission password.

BRIEF DESCRIPTION OF THE DRAWINGS

FIG. 6 is a flow chart of an example process that may be carried out by a server computing device for use in decommissioning the motor of FIG. 1.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

Implementations of the systems and methods described herein enable a motor to be diagnosed and decommissioned (i.e., disabled) in the field (i.e., where the motor is installed). Accordingly, some implementations may eliminate the need to physically transport the motor to a service facility (e.g., a facility of the manufacturer of the motor) for diagnosis and decommissioning.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
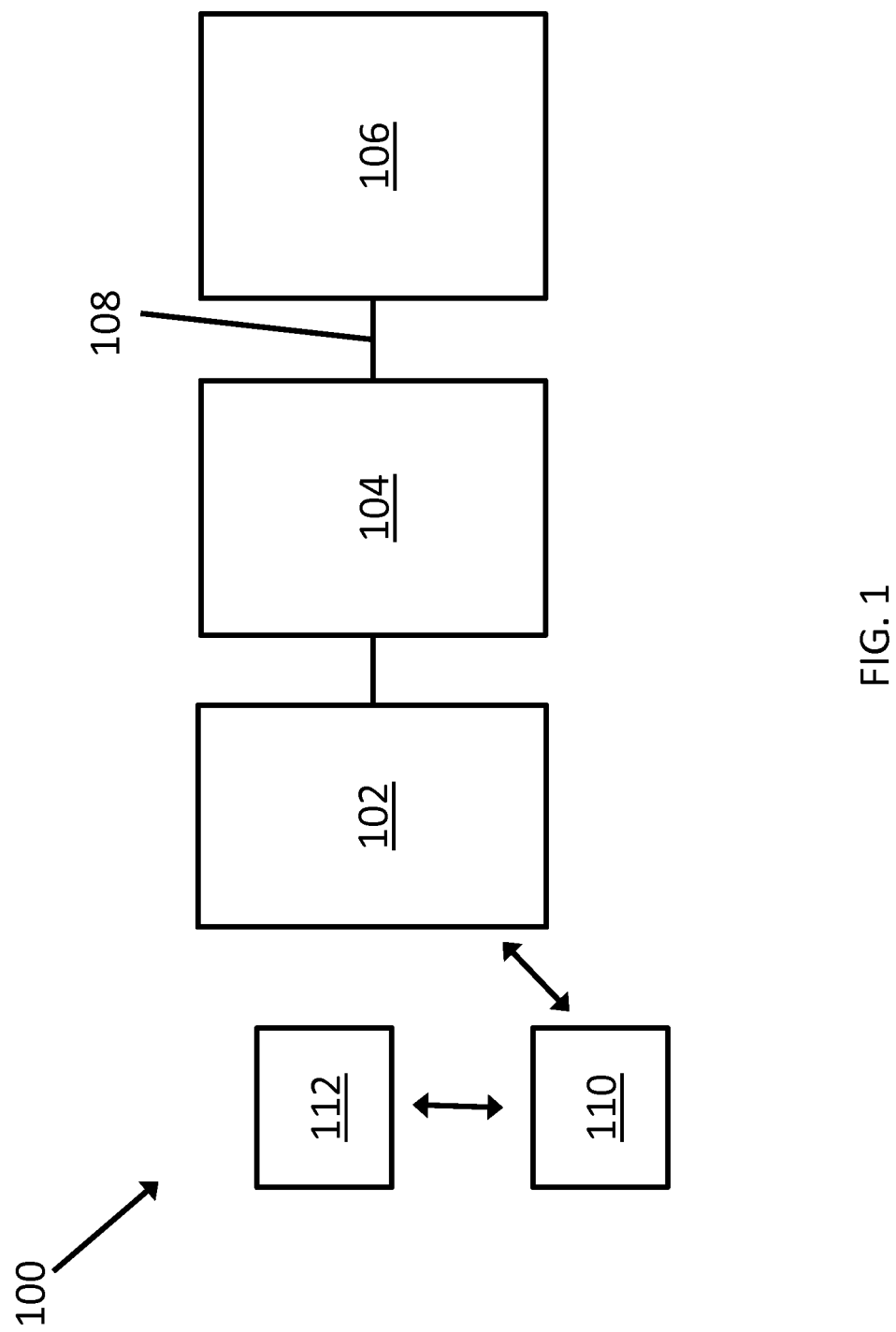
FIG. 1 is a block diagram of an example environment in which a motor controller may decommission a motor through communication with a client computing device.

FIG. 1 is a block diagram of an example environment in which a motor controller 102 may decommission a motor 104 through communication with a client computing device 110. Motor controller 102 is coupled to motor 104. In this description, "coupled to" means included within, integrated with, physically connected to, or in electrical communication with another component. In some implementations, motor 104 is an electric motor. In some implementations, motor 104 is a variable speed electric motor, such as an electronically commutated motor (ECM). Motor 104 drives a load 106, such as a fan in a heating, ventilation, and air conditioning (HVAC) system, or an impeller in a pump. Motor 104 is coupled to load 106 by a shaft 108.

Motor controller 102 is configured to operate motor 104 according to settings stored in a memory device 210 (FIG. 2) of motor controller 102. The settings may include modes of operation, wherein each mode is associated with a time period and a speed. Additionally, motor controller 102 stores diagnostic data in memory device 210. The diagnostic data includes at least one record of a status of motor 104. For example, the diagnostic data may include a record of a fault, such as a shutdown of motor 104 that was not performed in response to a user-initiated command to shut down the motor. For example, motor 104 may have shut down because of an overheating condition, an over current condition, an over voltage condition, or another condition that exceeds operating parameters for which motor 104 was designed. The diagnostic data may additionally or alternatively include a record of another anomaly that indicates that motor 104 is operating outside of predetermined operating parameters and that may indicate an issue with the installation of motor 104.

Client computing device 110 is configured to communicate with motor controller 102 to obtain identification data and the diagnostic data from motor controller 102 and potentially cause motor 104 to be decommissioned (e.g., permanently disabled). As described herein, client computing device 110 may communicate with a server computing device 112, which may be remotely located, to report data pertaining to motor controller 102 and motor 104 and, in some implementations, to receive at least one password for use in decommissioning motor 104. Through communications with client computing device 110, server computing device 112 may perform steps of an administrative process for decommissioning motor 104, including receiving a data package pertaining to motor 104 and applying a credit to an account associated with motor 104.

Figure 2:
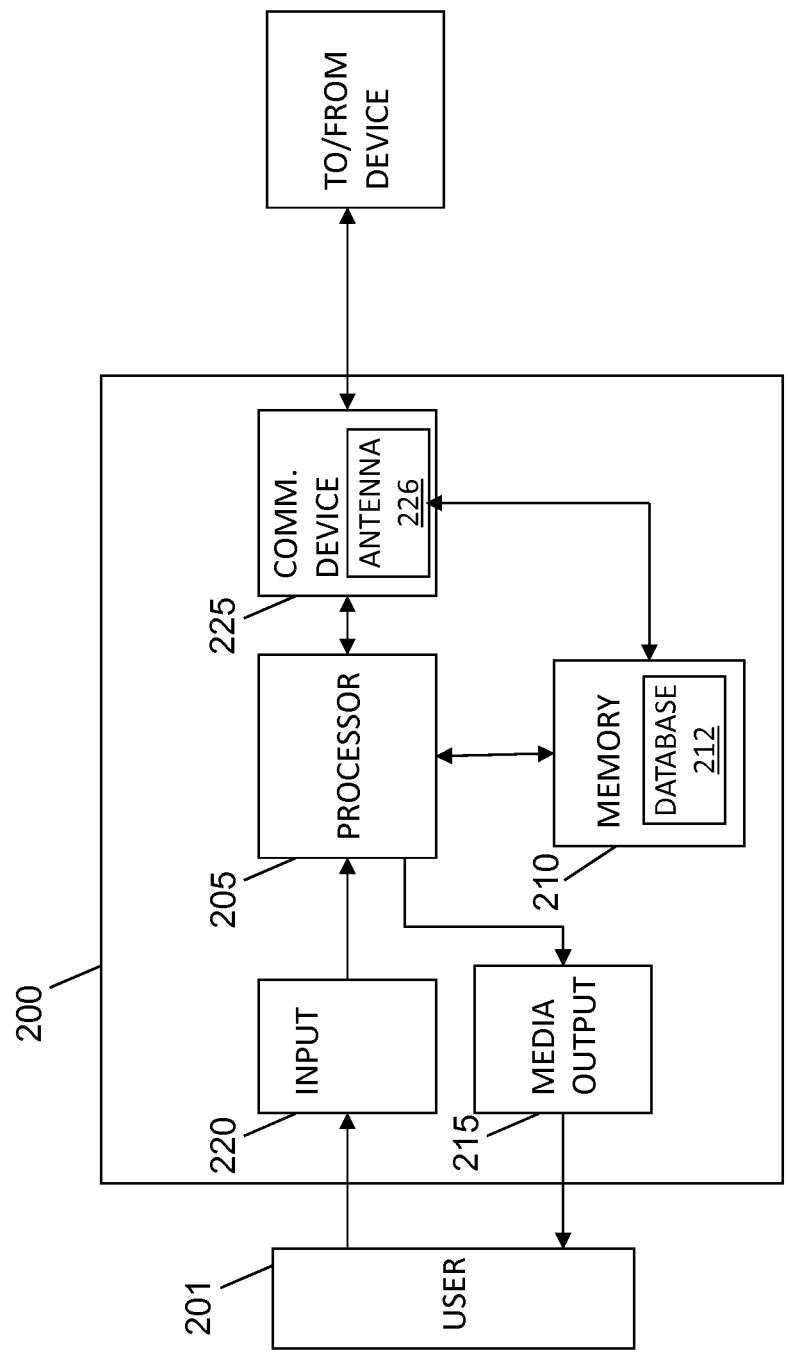
FIG. 2 is a block diagram of an example computing device.

FIG. 2 is a block diagram of an example computing device 200. For example, motor controller 102, client computing device 110, and server computing device 112 may be implementations of computing device 200. Computing device 200 includes a processor 205 for executing instructions. In some implementations, executable instructions are stored in a memory device 210 to enable computing device 200 to carry out processes described herein. Processor 205 may include one or more processing units (e.g., in a multi-core configuration). Memory device 210 is any device allowing information such as executable instructions and/or other data to be stored and retrieved. Memory device 210 may include a database 212. For example, with respect to server computing device 112, database 212 may include customer account numbers and identification data for motors (e.g., motor 104) manufactured by a particular manufacturer. In some implementations, database 212 may instead be external to, and in communication with, computing device 200, rather than being included within computing device 200. In some implementations, memory device 210 may be separated into multiple memory devices.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220.

Computing device 200 may also include a communication device 225, which is communicatively couplable to another device. For example, client computing device 110 may communicatively couple with motor controller 102 and server computing device 112 using communication device 225. Communication device 225 may include, for example, a wired or wireless network adapter or a wireless data transceiver for use with a mobile phone network (e.g., Global System for Mobile communications (GSM), 3G, 4G), a short-range wireless network (e.g., Bluetooth), or other mobile data network (e.g., Worldwide Interoperability for Microwave Access (WIMAX)). In some implementations, communication device 225, particularly in implementations in which communication device 225 communicates wirelessly, is coupled to an antenna 226. In some implementations, particularly with regard to motor controller 102 and client computing device 110, communication device 225 is capable of performing near field communication (NFC). Additionally, in some implementations, computing device 200 may use power received through antenna 226 to perform operations, without receiving or relying on power from any other power source, as described herein. For example, in some implementations, antenna 226 is directly connected to memory 210. In such implementations, memory 210 and/or communication device 225 derive power from antenna 226 and thereby enable decommissioning and programming operations to take place when motor 104, motor controller 102, and processor 205 do not have power. This allows customers and service technicians to communicate with motor 104 and/or motor controller 102 without host system power or even while motor 104 is packaged or crated for shipment. As described herein, wireless communication takes place with memory 210 at any time (with or without power), and processor 205 accesses memory 210 only when power is applied. With power applied, processor 205 accesses memory 210 and determines if there is new information, commands, etc.

Figure 3:
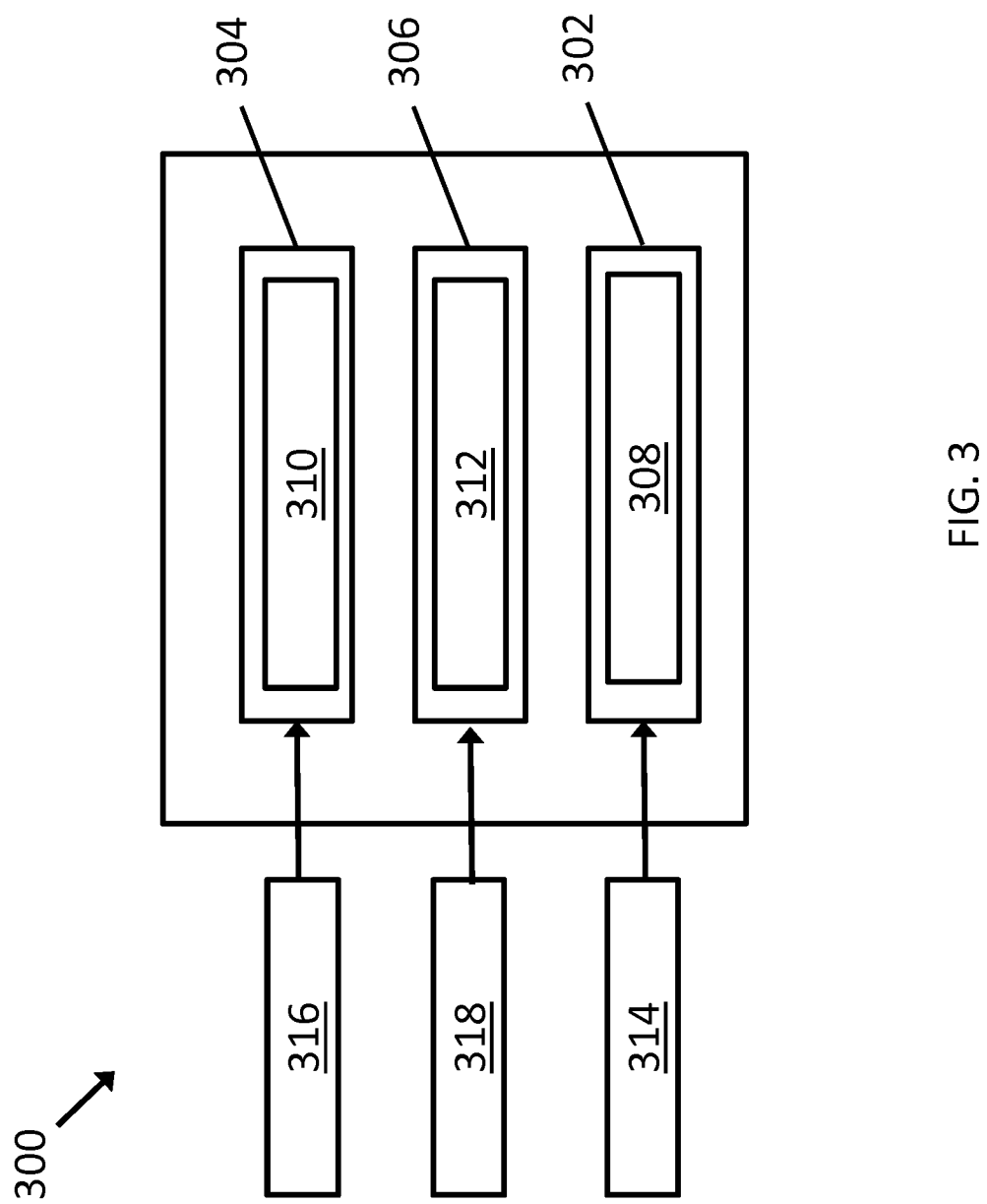
FIG. 3 is a block diagram of memory sections within a memory device of the motor controller of FIG. 1.

FIG. 3 is a block diagram of a memory device 300 of motor controller 102. Memory device 300 may be similar to memory device 210, described above. In some implementations, at least a portion of memory device 300 may be included within communication device 225 in motor controller 102. Memory device 300 includes a first section 302, a second section 304, and a third section 306. First section 302 stores diagnostic data 308, as described above. Second section 304 stores identification data 310, which may include, for example, identification data for motor controller 102, identification data for motor 104, and/or identification data for communication device 225. The identification data includes a code (e.g., a serial number) that uniquely identifies at least one of motor controller 102, motor 104, and communication device 225.

Third section 306 stores enabling data 312. More specifically, in some implementations, if enabling data 312 is all or partially deleted or overwritten with different data, motor controller 102 will prevent operation of motor 104. For example, in some implementations, motor controller 102 checks for the presence of enabling data 312 in memory section prior to enabling operations of motor 104, prior to issuing a command to motor controller 104, or at other times, such that motor 104 is effectively permanently disabled (i.e., decommissioned). In some implementations, motor controller 102 not only checks for the presence of enabling data 312, but determines whether enabling data 312 matches a reference set of data, prior to enabling operation of motor 104. For example, motor controller 102 may compare enabling data 312 to identification data 310 and determine if they correspond with each other. In some implementations, for example, motor controller 102 may determine whether enabling data 312 matches identification data 310 when identification data 310 is transformed or encrypted according to a specific algorithm that motor controller 102 may be configured to perform.

As described herein, motor controller 102 and client computing device 110 may communicate data and/or instructions. In some implementations, motor controller 102 is configured to access (i.e., read or write to) memory sections 302, 304, and 306 only after client computing device 110 transmits a corresponding password. For example, motor controller 102 may require a first password 314 to access first memory section 302, a second password 316 to access second memory section 304, and a third password 318 to access third memory section 306. In some implementations, first password 314 and/or second password 316 may be fixed, meaning that they are the same for any motor controller 102. In some implementations, third password 318 may be an encrypted or otherwise transformed version of all or a portion of identification data 310, such that a specific algorithm for encrypting or transforming identification data 310 must be used in order to generate third password 318. In some implementations, client computing device 110 is configured to perform the specific algorithm and generate third password 318. In other implementations, client computing device 110 is configured to transmit identification data 310 to server computing device 112 and receive third password 318 from server computing device 112. First password 314 may be considered a diagnostic password, second password 316 may be considered an identification password, and third password 318 may be considered a decommission password. As described above, communication device 225 may be configured to perform near field communication (NFC) with client computing device 110. In some implementations, motor controller 102 may use power received through antenna 226 to read from and write to memory device 300.

Figure 4:
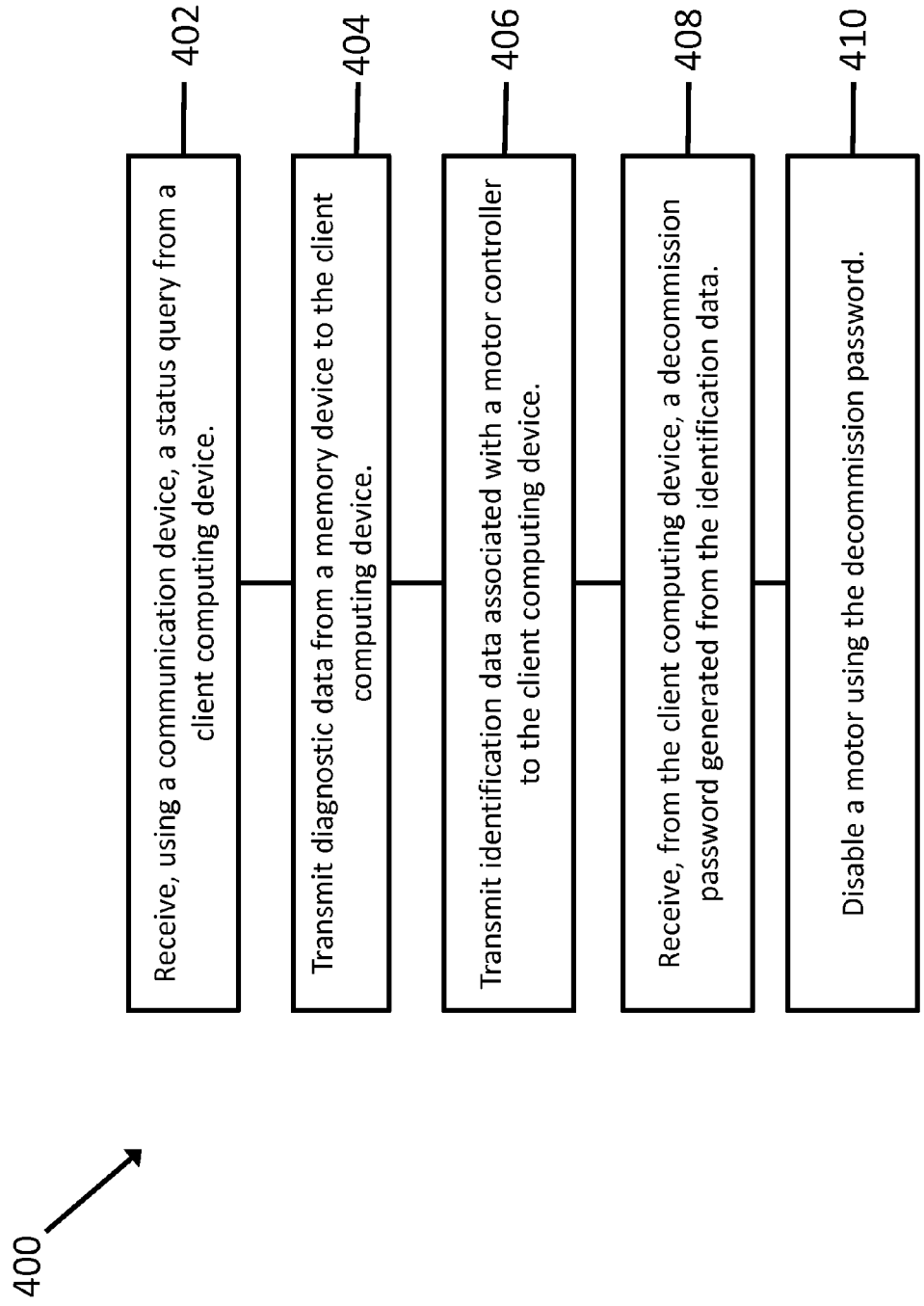
FIG. 4 is a flow chart of an example process that may be carried out by the motor controller of FIG. 1 for decommissioning the motor of FIG. 1.

FIG. 4 is a flow chart of an example process 400 that may be carried out by motor controller 102 for decommissioning motor 104. Initially, motor controller 102 receives 402, using communication device 225, a status query from client computing device 110. Afterwards, motor controller 102 transmits 404 diagnostic data 308 from memory device 300 to client computing device 110. Additionally, motor controller 102 transmits 406 identification data 310 to client computing device 110. Additionally, motor controller 102 receives 408, from client computing device 110, decommission password 318, which was generated from identification data 310. Afterwards, motor controller 102 disables 410 motor 104 using decommission password 318. More specifically, and as described above, motor controller 102 is configured to access enabling data 312 only when decommission password 318 is provided by client computing device 110. After receiving decommission password 318, motor controller 102 may delete or overwrite all or a portion of enabling data 312 such that motor becomes disabled (i.e., decommissioned), as described above.

In some implementations of decommissioning process 400, processor 205 is not powered and near field communication occurs between client computing device 110 and memory 210, through antenna 226. In some implementations, processor 205 does not receive power and, accordingly, does not operate to encrypt communications with client computing device 110. In other implementations, antenna 226 receives sufficient power to enable processor 205 to operate and encrypt communications with client computing device 110 during decommissioning process 400.

In some implementations, motor controller 102 transmits diagnostic data 308, transmits identification data 310, and disables motor 104 using power wirelessly received by communication device 225 from client computing device 110. Accordingly, even if motor 104 is unable to receive line power from an external power source (not shown), motor controller 102 may perform process 400 using power received through antenna 226. In some implementations, motor controller 102 receives first password 314 (i.e., diagnostic password) from client computing device 110 prior to transmitting 404 diagnostic data 308 to client computing device 110. In some implementations, motor controller 102 receives second password 316 (i.e., identification password) from client computing device 110 prior to transmitting 406 identification data 310 to client computing device 110. As described above, identification data 110 may include a unique serial number assigned to communication device 225, motor controller 102, and/or motor 104. As described above, diagnostic data 308 may include a record of at least one fault, such as a shutdown of motor 104 that was not performed in response to a user-initiated command to shut down the motor.

Figure 5:
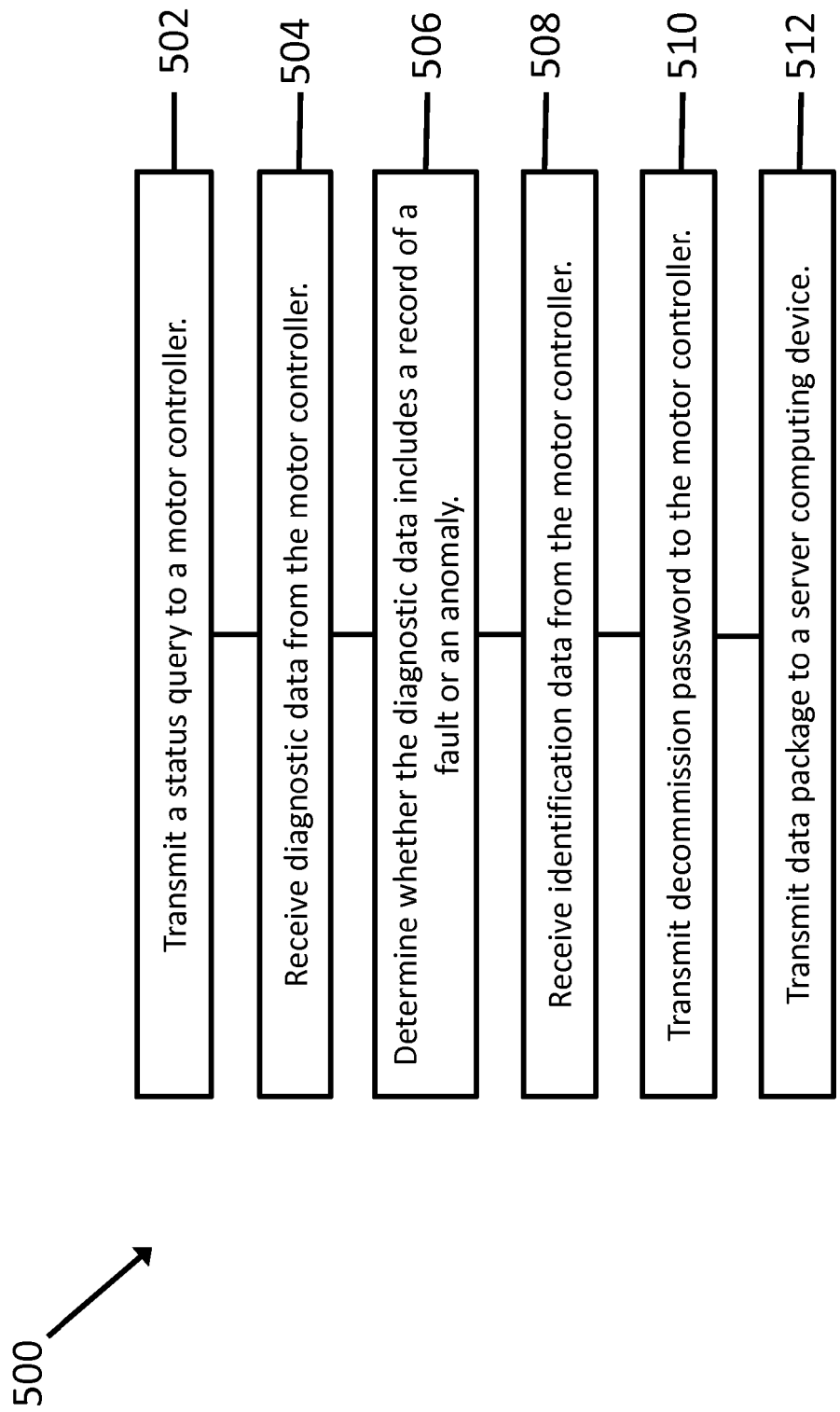
FIG. 5 is a flow chart of an example process that may be carried out by the client computing device of FIG. 1 for use in decommissioning the motor of FIG. 1.

FIG. 5 is a flow chart of an example process 500 that may be carried out by client computing device 110 for use in decommissioning motor 104. Initially, client computing device 110 transmits 502 a status query to motor controller 102. Additionally, client computing device 110 receives 504 diagnostic data 308 from motor controller 102. Additionally, client computing device 110 determines 506 whether diagnostic data 308 includes a record of a fault or an anomaly. If client computing device 110 determines that diagnostic data does not include a record of a fault or other anomaly, client computing device 110 may display a message to user 201 that motor 104 has operated normally, that motor will not be decommissioned, and that no credit will be applied to a customer account associated with motor 104. If client computing device 110 determines that diagnostic data 308 includes a record of an anomaly that indicates an issue with the installation of motor 104, client computing device 110 may display a message that an issue with the installation of motor 104 may exist, an instruction to investigate the installation of motor 104, that motor 104 will not be decommissioned, and that no credit will be applied to a customer account associated with motor 104. If client computing device 110 determines that diagnostic data 308 does not include a record of a fault, client computing device 110 does not continue process 500. Otherwise, client computing device 110 continues process 500 as described below.

Client computing device 110 receives 508 identification data 310 from motor controller 102. In some implementations, client computing device 110 transmits identification data 310 to server computing device 112 and receives decommission password 318 from server computing device 112. In other implementations, client computing device 110 performs an algorithm to encrypt or otherwise transform identification data 310 to generate decommission password 318. Additionally, client computing device 110 transmits 510 decommission password 318 to motor controller, whereupon motor controller 102 disables (i.e., decommissions) motor 104, as described above.

Additionally, client computing device 110 transmits 512 a data package to server computing device 112. The data package may include, for example, identification data 310 and diagnostic data 308. In some implementations, the data package additionally includes enabling data 312. In some implementations, client computing device 110 transmits data, including the data package, to server computing device 112 through an encrypted channel. In some implementations, client computing device 110 additionally displays a message that motor 104 has been decommissioned and must be sent to the manufacturer, or that motor 104 has been decommissioned and should be discarded, and that a credit will be applied to a customer account associated with motor 104.

FIG. 6 is a flow chart of an example process 600 that may be carried out by server computing device 112 for use in decommissioning motor 104. Server computing device 112 receives 602 identification data 310 from client computing device 110. Additionally, server computing device 112 verifies 604 the authenticity of motor 104 based on identification data 310. More specifically, server computing device 112 queries database 212 and determines whether identification data 310 is present in database 212. If identification data 310 is not present in database 212, server computing device 112 may transmit a message to client computing device 110 that motor 104 is unsupported because it was manufactured by a different manufacturer, and does not send decommission password 318 to client computing device 110, thereby preventing client computing device 110 from performing steps 510 and 512 of process 500. If server computing device 112 determines that identification data 310 is present in database 212, server computing device 112 transmits 606 decommission password 318 to client computing device 110. Additionally, server computing device 112 receives 608 the data package from client computing device, described above with reference to step 512 of process 500. Additionally, server computing device 112 applies 610 a credit to a customer account associated with motor 104. For example, server computing device 112 may apply a credit equal to the purchase price of motor 104.

Embodiments of the systems and methods described herein enable a motor to be diagnosed and decommissioned (i.e., disabled) in the field (i.e., where the motor is installed). Accordingly, embodiments of the systems and methods described herein may eliminate the need to physically transport the motor to a service facility (e.g., manufacturer of the motor) for diagnosis and decommissioning.

A technical effect of the methods and systems described herein may include one or more of: (a) receiving, using a communication device, a status query from a client computing device; (b) transmitting diagnostic data from a memory device to the client computing device; (c) transmitting identification data associated with a motor controller to the client computing device; (d) receiving, from the client computing device, a decommission password generated from the identification data; and (e) disabling the motor using the decommission password.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A motor controller for a motor, said motor controller comprising a communication device coupled to a memory device, said motor controller configured to:
   receive, using said communication device, a status query from a client computing device;
   transmit diagnostic data from said memory device to the client computing device;
   transmit identification data associated with said motor controller to the client computing device;
   receive, from the client computing device, a decommission password generated for said motor controller from the identification data, wherein the decommission password is received when the client computing device confirms record of a fault within the diagnostic data; and
   disable the motor using the decommission password.

2. The motor controller of claim 1, wherein said motor controller is configured to transmit the diagnostic data, transmit the identification data, and disable the motor using power wirelessly received by said communication device from the client computing device.

3. The motor controller of claim 1, further configured to disable the motor using the decommission password by deleting or overwriting at least a portion of password-protected enabling data stored in said memory device.

4. The motor controller of claim 1, further configured to receive a diagnostic password from the client computing device prior to transmitting the diagnostic data to the client computing device.

5. The motor controller of claim 1, further configured to receive an identification password from the client computing device prior to transmitting the identification data to the client computing device.

6. The motor controller of claim 1, wherein transmit identification data includes transmitting a unique serial number assigned to said communication device to the client computing device.

7. The motor controller of claim 1, wherein transmit diagnostic data includes transmitting a record of at least one fault of the motor.

8. The motor controller of claim 1, further configured to:
   determine whether the password-protected enabling data corresponds with the identification data; and
   prevent operation of the motor when the password-protected enabling data does not correspond with the identification data.

9. A method for decommissioning a motor, said method is implemented by a motor controller coupled to the motor, the motor controller includes a communication device coupled to a memory device, said method comprising:
   receiving, using the communication device, a status query from a client computing device;

transmitting diagnostic data from the memory device to the client computing device;
transmitting identification data associated with the motor controller to the client computing device;
receiving, from the client computing device, a decommission password generated for the motor controller from the identification data, wherein the decommission password is received when the client computing device confirms record of a fault within the diagnostic data; and
disabling the motor using the decommission password.

10. The method of claim 9, further comprising transmitting the diagnostic data, transmitting the identification data, and disabling the motor using power wirelessly received by the communication device from the client computing device.

11. The method of claim 9, wherein disabling the motor further comprises disabling the motor using the decommission password by deleting or overwriting at least a portion of password-protected enabling data stored in the memory device.

12. The method of claim 9, further comprising receiving a diagnostic password from the client computing device prior to transmitting the diagnostic data to the client computing device.

13. The method of claim 9, further comprising receiving an identification password from the client computing device prior to transmitting the identification data to the client computing device.

14. The method of claim 9, wherein transmitting the identification data further comprises transmitting a unique serial number assigned to the communication device to the client computing device.

15. The method of claim 9, wherein transmitting the diagnostic data further comprises transmitting a record of at least one fault of the motor.

16. The method of claim 9, further comprising:
determining whether the password-protected enabling data corresponds with the identification data; and
preventing operation of the motor when the password-protected enabling data does not correspond with the identification data.

17. A computer-readable storage medium having computer-executable instructions embodied thereon, enabling a motor controller coupled to a motor to decommission the motor, the motor controller including a communication device coupled to a memory device, wherein when executed by the motor controller, the computer-executable instructions cause the motor controller to:
receive, using the communication device, a status query from a client computing device;
transmit diagnostic data from the memory device to the client computing device;
transmit identification data associated with the motor controller to the client computing device;
receive, from the client computing device, a decommission password generated for the motor controller from the identification data, wherein the decommission password is received when the client computing device confirms record of a fault within the diagnostic data; and
disable the motor using the decommission password.

18. The computer-readable storage medium of claim 17, wherein said computer-executable instructions further cause the motor controller to transmit the diagnostic data, transmit the identification data, and disable the motor using power wirelessly received by the communication device from the client computing device.

19. The computer-readable storage medium of claim 17, wherein said computer-executable instructions further cause the motor controller to disable the motor using the decommission password by deleting or overwriting at least a portion of password-protected enabling data stored in the memory device.

20. The computer-readable storage medium of claim 17, wherein said computer-executable instructions further cause the motor controller to receive a diagnostic password from the client computing device prior to transmitting the diagnostic data to the client computing device.

* * * * *